United States Patent [19]

Basmajian

[11] 4,073,069

[45] Feb. 14, 1978

[54] TURBINE DEMONSTRATION

[75] Inventor: Vahan V. Basmajian, Billerica, Mass.

[73] Assignee: Megatech Corporation, Billerica, Mass.

[21] Appl. No.: 716,384

[22] Filed: Aug. 23, 1976

[51] Int. Cl.$^2$ ............... G09B 25/02; F01D 15/10; H02K 7/18

[52] U.S. Cl. ............... 35/13; 35/51; 290/52; 415/202

[58] Field of Search ............... 35/10, 13, 49–53; 415/202; 290/42, 43, 44, 52

[56] References Cited

U.S. PATENT DOCUMENTS

| 867,407 | 10/1907 | Patitz | 415/202 X |
| 883,528 | 3/1908 | De Remer | 415/202 X |
| 1,101,618 | 6/1914 | Dake | 290/52 |
| 3,082,546 | 3/1963 | Van Baerle | 35/10 |

FOREIGN PATENT DOCUMENTS

| 154,104 | 7/1963 | U.S.S.R. | 35/13 |

OTHER PUBLICATIONS

A Catalogue of Scientific Instruments, L. E. Knott Apparatus Co. 1916 pp. 142, 237, 238, title and copyright pages.

Primary Examiner—William H. Grieb
Attorney, Agent, or Firm—Charles Hieken

[57] ABSTRACT

Turbine demonstration apparatus comprises a turbine rotor wheel made of a central circular disc with arc-bent plate turbine blades mounted on and bonded to the disc at close and regular intervals around the disc periphery and a stator-housing with a transparent cover for enclosing the turbine wheel, holding one or more feed nozzles and providing a stator reaction mount for the nozzles, the wheel and its housing being mounted from an instrument chassis containing parameter adjusting means and turbine output adjusting and measuring means to provide a compact, economical demonstrator of turbine operation.

1 Claim, 5 Drawing Figures

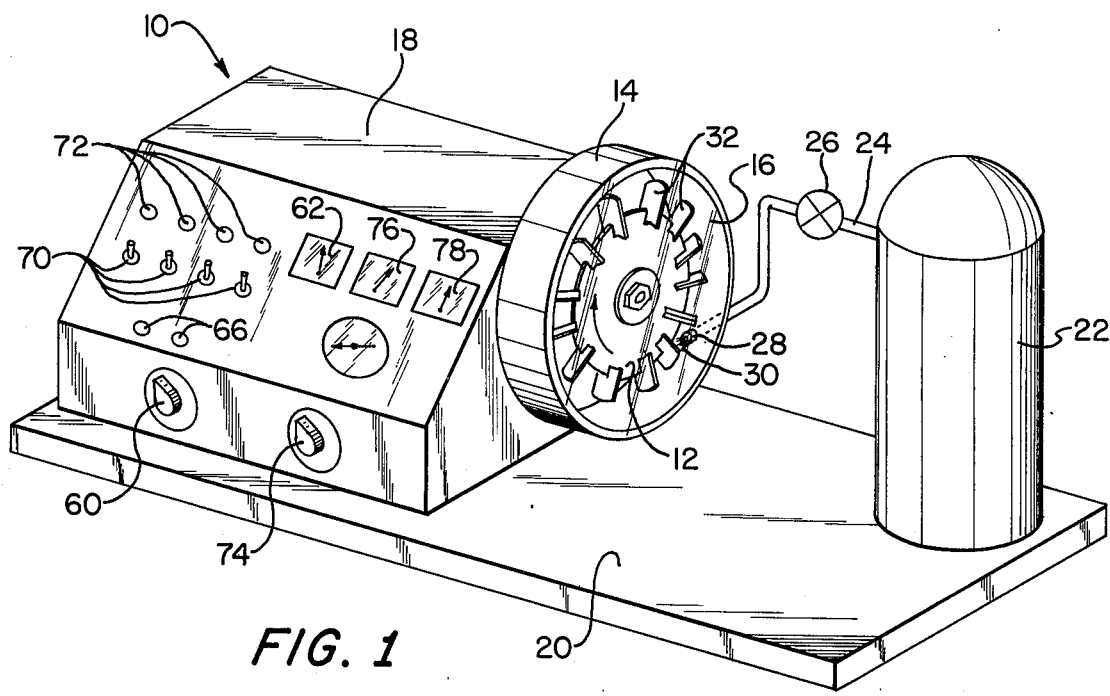
FIG. 1
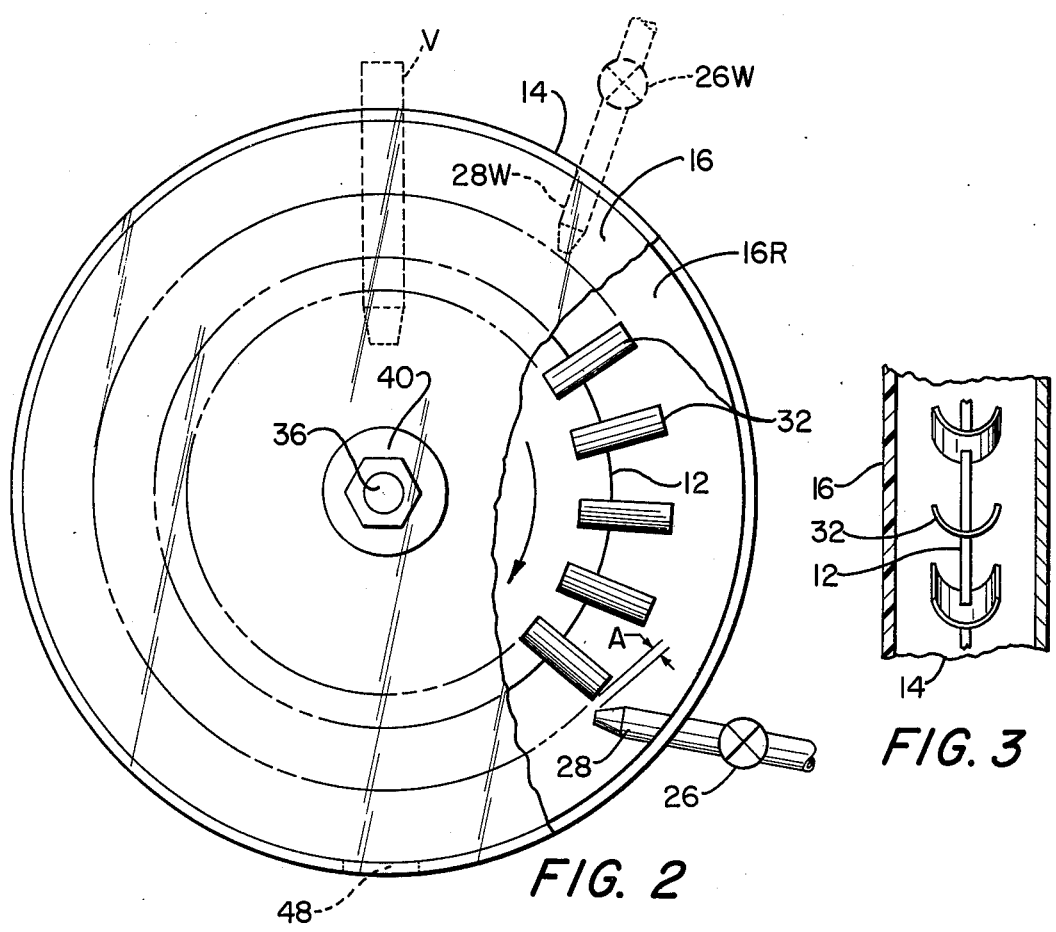
FIG. 2
FIG. 3

TURBINE DEMONSTRATION

BACKGROUND OF THE INVENTION

The present invention relates to educational and demonstration apparatus and more particularly to an instrument for demonstrating the principles of power control. The invention is particularly characterized in the provision of an economical compact apparatus for effectively demonstrating the interrelated effects of turbine driving conditions and loading conditions and further by flexibility enabling use of common apparatus with different motive fluids.

Fundamentals of turbine operation and turbo-electric power generation are widely taught in high school, college and vocational training curricula.

It is an important object of the invention to provide turbine demonstration apparatus useful in displaying the interrelationship of turbine operating and loading conditions.

It is a further object of the invention to demonstrate the principles of turboelectric power generation consistent with the preceding object.

It is a further object of the invention to accommodate a variety of operating fluids for turbine demonstration consistent with one or both of the preceding objects.

It is a further object of the invention to provide compact, economical demonstration apparatus consistent with one or more of the preceding objects.

It is a further object of the invention to provide highly visual and easily understood demonstration apparatus consistent with one or more of the preceding objects.

SUMMARY OF THE INVENTION

In accordance with the invention, turbine demonstration apparatus comprises a turbine wheel made up of a central circular disc with arc-bent plate turbine blades mounted on and bonded to the disc at close and regular intervals around the disc periphery. The turbine wheel is contained in a shallow housing with a transparent cover for enclosing the turbine wheel and providing a stator reaction surface. A nozzle (or several nozzles) extend through the housing for ejecting fluid against the blades. The fluid may be compressed air, steam or water. A source of such motive fluid is provided in the demonstration apparatus.

An instrument containing an electrical generator is also provided in the apparatus. The generator shaft is drivingly coupled to the turbine wheel. Preferably, the generator is housed in an instrument chassis and a turbine generator control circuit is contained in the chassis and includes means for adjusting generator field currents and for adjusting armature load current. Ammeters are also provided for measuring field current and armature current. Armature voltage is also measured and displayed and the generator output is switchable between internal load and external output terminals allowing alternative loads to be provided for increasing the flexibility of the apparatus in making a wide variety of demonstrations.

The user of the apparatus can adjust the fluid flow conditions, e.g., turning a compressed air emitting valve etc., and see the turbine wheel slow down or speed up. He can also see the effect of changes of turbine operating condition on generator armature current under various internal or external load conditions established by him. He can see the basic principles of impulse turbine drive in action.

Other objects, features and advantages of the invention will be apparent from the following detailed description of preferred embodiments thereof, in which,

BRIEF DESCRIPTION OF THE DRAWING

FIG. 1 is an isometric view of turbine demonstration apparatus in accordance with a preferred embodiment of the invention;

FIG. 2 is a partially sectioned face view of the turbine wheel and turbine wheel cover components of the FIG. 1 embodiment;

FIGS. 3 and 4 are partially sectioned, top and side views, respectively, of the FIG. 2 components, additionally showing the generator and generator shaft drivingly coupled to the turbine wheel in FIG. 4.

DETAILED DESCRIPTION OF PREFERRED EMBODIMENTS

Figure 4:
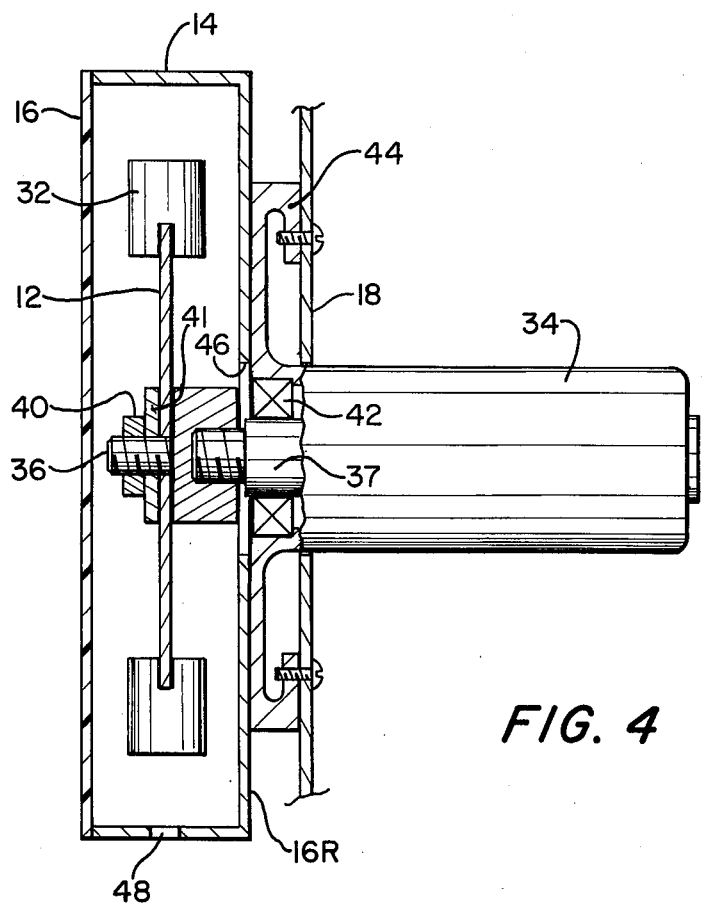

Referring now to FIG. 1, a turbine demonstration apparatus 10 in accordance with a preferred embodiment of the invention comprises a turbine wheel 12 contained in a short cylindrical housing having transparent covers 16 and 16R. The housing is mounted from an instrument chassis 18 and the wheel 12 is drivingly coupled to an electric generator (not shown) mounted within the chassis.

The chassis 18 mounting the turbine housing 14 is mounted on a common plate 20 with a steam generator 22 connected to the housing 14 via a steam line 24 with control valve 26 and terminating within the cover in a nozzle 28 ejecting a steam jet, indicated at 30, against the blades 32 of the turbine wheel 12.

Referring now to FIGS. 2-4, together with FIG. 1, it is shown that the wheel 12 comprises a plate form disc, preferably made of 304 stainless steel, 0.062 inch thick. The blades 32 are made from metal tubing, preferably 304 stainless steel 0.035 inch thick. Typically, half inch diameter tubing is cut to 160° of circular arc and ¾ inches long with one-third to one-half of such cut lengths set into corresponding notches in the disc periphery and brazed therein. The wheel is drivingly coupled to a generator 34 within the chasis 18 via an extension shaft 36 secured to the shaft 37 of generator 34 and is clamped by a washer 41 longitudinally placed on the shaft and nut 40 screwed on to a threaded end portion of extension shaft 36. Bearing for the shaft 36 is provided by the generator shaft 37 which passes through the generator bearing 42. The back cover 16R of the housing 14 is directly clamped to the generator end housing 44 which is in turn clamped to chassis 18 as indicated in FIG. 4.

The generator shaft 37 passes through a hole 46 in the cover 16R of assembly 14 allowing a large clearance. A drain hole 48 is provided in the cover assembly 14 to allow escape of steam or of water brought in by nozzle 28 when steam or water is the driving fluid. Water is provided by a connection of the nozzle 28 to a tap water source in lieu of a steam generator 22 of FIG. 1.

Figure 5:
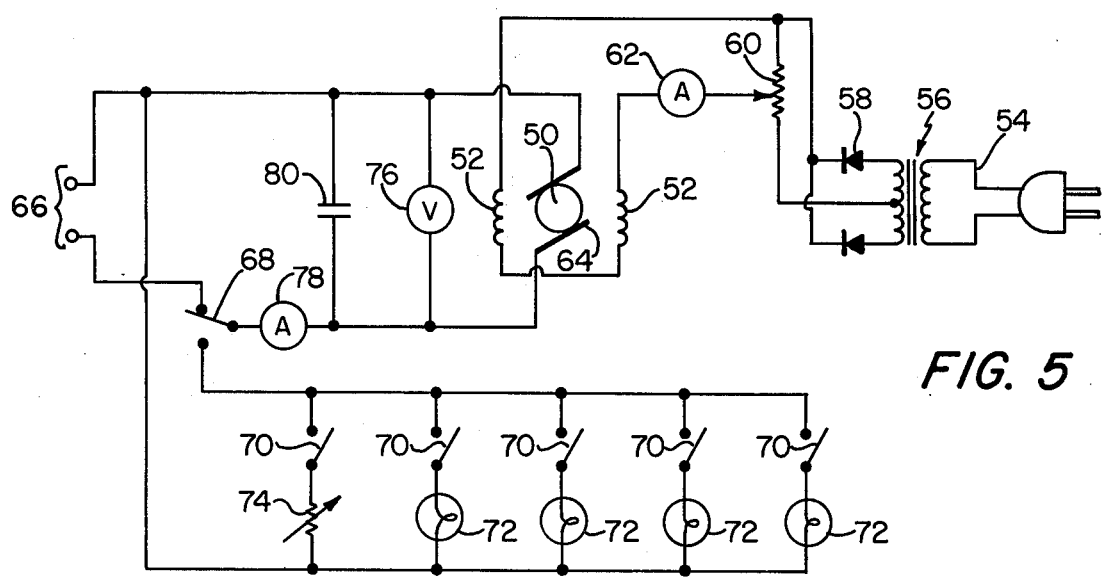
FIG. 5 is an electrical circuit diagram for the FIG. 1-4 apparatus.

Referring now to FIGS. 1, 4 and 5 together, the generator 34 comprises an armature 50 and separately wound field coils 52 powered by a line cord 54 via a transformer 56, rectifier 58 and potentiometer 60. An ammeter 62 in the field circuit measures field current. Voltage developed across the commutator brushes 64 of the armature 50 may be applied to external power output terminals 66 or selectively, via a switch 68, applied to an internal load circuit comprising multiple switches 70 and a plurality of fixed resistance loads 72 (e.g., lamps) and a variable resistance load 74 (e.g., a rheostat). A voltmeter 76 and ammeter 78 are provided in the armature circuit and capacitor 80 protects the voltmeter 76.

The wheel comprises, typically, 20 blades on a 4 inch diameter central portion for gas fluid drive and may be half that size with 10 blades for water power. A 0.1 inch diameter nozzle may be used for water and 0.06 inches for gas. With such dimensioning motive fluid pressures may be 70 psi for steam, 100 psi for air or water, to drive the wheel at 10,000-20,000 rpm and produce 0-5 ampere field and armature current ranges.

The transparent cover plate 16 is typically made of polycarbonate ¼ inch thick and secured to the balance of the housing as follows.

The housing 14 has grooves (not shown) at its faces to accommodate O-ring seals to the plates 16-16R, attached thereto with 12-6-32 screws distributed peripherally. Axial and radial clearances for the wheel are typically between 7/16 and ½ inch axially between the end plates 16-16R and buckets 32 and approximately one inch radially for steam and 2¼ inches for water. Clearances much smaller than this will interfere with the operation with water and much larger clearances would be unnecessary. In using the apparatus as a steam turbine, a TEFLON bushing is used around the nozzle 30 in the steam turbine to reduce heat loss to the aluminum housing 14. Preferably, the nozzle is aligned as shown to provide a desired 1/32 to 1/16 inch clearance, indicated at A, between the nozzle tip and the buckets. The nozzle is faced toward the drain so residual momentum of the jet aids draining action as indicated in the phantom showing of a nozzle 28W with a control valve 26W. Also provided is a ¼ inch diameter vent tube V (FIG. 2) extending from the top down near the shaft to prevent suction from building up and stopping the draining action. A return hose can be provided at drain 48 to move water to a sink.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Turbine demonstration apparatus comprising, means defining a turbine wheel for rotating in response to impingement of a driving fluid thereon, the wheel construction comprising a central circular plate form disc with elongated, circular arc plate turbine blades mounted on and bonded to the disc at close and regular intervals around the disc periphery, said blades seating in spaced radial notches of the disc and partially overlapping the disc, means defining a shallow depth turbine wheel housing, with a transparent cover, for enclosing the turbine wheel, means defining at least one nozzle extending through the housing for ejecting fluid against the blades, said housing providing a stator reaction mount for the nozzle, means defining a turbine control instrument chassis mounting an electrical generator and generator load circuit therein with a generator driving shaft extending through a chassis opening, means for suspending said turbine wheel housing from said chassis and for drivingly coupling said shaft to the turbine wheel, means defining at least one generator output measuring instrument mounted in said chassis and having a viewable display thereon, chassis mounted means for adjusting the generator load circuit, chassis mounted means for adjusting the field current of said electrical generator, said at least one generator output measuring instrument comprising means for measuring the armature current of said electrical generator, said electrical generator being mounted from a sidewall of said chassis and within said chassis, a shaft extension suspended from the shaft of said electrical generator and carrying said wheel to constitute said means for drivingly coupling, means for generating motive fluid, and common mounting means for said motive fluid generating means and said turbine control instrument chassis.

* * * * *